United States Patent
Zhang et al.

(10) Patent No.: US 11,848,959 B2
(45) Date of Patent: Dec. 19, 2023

(54) METHOD FOR DETECTING AND DEFENDING DDOS ATTACK IN SDN ENVIRONMENT

(71) Applicant: Nanjing University of Posts and Telecommunications, Nanjing (CN)

(72) Inventors: Dengyin Zhang, Nanjing (CN); Kang Liu, Nanjing (CN); Jie Dong, Nanjing (CN); Yuanpeng Zhao, Nanjing (CN); Rong Zhao, Nanjing (CN)

(73) Assignee: Nanjing University Of Posts And Telecommunications, Nanjing (CN)

(*) Notice: Subject to any disclaimer, the term of this patent is extended or adjusted under 35 U.S.C. 154(b) by 305 days.

(21) Appl. No.: 17/321,535

(22) Filed: May 17, 2021

(65) Prior Publication Data

US 2021/0360024 A1 Nov. 18, 2021

Related U.S. Application Data

(63) Continuation-in-part of application No. PCT/CN2020/115251, filed on Sep. 15, 2020.

(30) Foreign Application Priority Data

May 13, 2020 (CN) .......................... 202010401640.9

(51) Int. Cl.
H04L 9/40 (2022.01)

(52) U.S. Cl.
CPC ...... *H04L 63/1458* (2013.01); *H04L 63/0281* (2013.01); *H04L 63/1416* (2013.01)

(58) Field of Classification Search
CPC ............. H04L 63/0281; H04L 63/1408; H04L 63/1416; H04L 63/1458
See application file for complete search history.

(56) References Cited

U.S. PATENT DOCUMENTS

| | | | |
|---|---|---|---|
| 2015/0310351 A1* | 10/2015 | Caplan | G06F 16/285 706/12 |
| 2016/0028751 A1* | 1/2016 | Cruz Mota | H04L 63/1408 726/23 |
| 2016/0105306 A1* | 4/2016 | Wu | H04L 47/10 370/221 |
| 2018/0109556 A1* | 4/2018 | Yoo | H04L 63/1458 |
| 2018/0191679 A1* | 7/2018 | Mulka | H04L 45/38 |
| 2019/0098043 A1* | 3/2019 | Banerjee | G06N 20/00 |
| 2019/0158635 A1* | 5/2019 | Donnelly | H04L 1/0007 |
| 2019/0188595 A1* | 6/2019 | Chen | G06F 9/445 |
| 2020/0169509 A1* | 5/2020 | Tigli | H04L 47/2441 |
| 2020/0244683 A1* | 7/2020 | Meshi | H04L 63/1425 |
| 2021/0092153 A1* | 3/2021 | Wei | H04L 45/64 |
| 2021/0314237 A1* | 10/2021 | Ogale | H04L 41/046 |
| 2022/0121994 A1* | 4/2022 | Sun | G06N 20/00 |

* cited by examiner

Primary Examiner — Daniel B Potratz
Assistant Examiner — Matthias Habtegeorgis
(74) Attorney, Agent, or Firm — Nitin Kaushik

(57) ABSTRACT

The disclosure provides a method for detecting and defending a Distributed Denial of Service attack in an SDN environment. The method includes: building data messages acquired as feature messages by a proxy module; sending the feature messages to a pre-built detection model to obtain a detection result; making a decision instruction based on the detection result; and performing control operations by the proxy module based on the decision instruction.

6 Claims, 4 Drawing Sheets

METHOD FOR DETECTING AND DEFENDING DDOS ATTACK IN SDN ENVIRONMENT

CROSS-REFERENCE TO RELAYED APPLICATIONS

This application is a continuation-in-part of International Patent Application No. PCT/CN2020/115251 with an international filing date of Sep. 15, 2020, designating the United States, and further claims foreign priority benefits to Chinese Patent Application No. 202010401640.9 filed May 13, 2020. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of network security, and more particularly to a method for detecting and defending a Distributed Denial of Service (DDoS) attack in a Software Defined Network (SDN) environment.

Software Defined Network (SDN) adopts a scheme of separating the data plane from the control plane to solve the problems in terms of high reliability, scalability and flexibility that cannot be solved by traditional networks. However, SDN also brings new security challenges while innovating in its services. In an SDN controller, service control and security control are highly coupled and interact with each other. A security control mechanism that controls the entire network security through a flow table needs to be improved, and all security controls can only reach a data forwarding layer without direct interaction with security devices or nodes, which makes the security control capability limited.

Existing SDN attack detection schemes fall into two main categories. The first category refers to statistical analysis-based detection schemes, which require fewer computing resources but are often inaccurate. The second category refers to machine learning-based schemes in which a detection module is usually disposed on a controller, which greatly consumes the computing resources of the controller and restrains the controller from issuing control commands to switches normally. When the switches and the controller are targeted by a DDoS (Distributed Denial of Service) attack, the attacker sends a large number of unknown packages, which may cause the switches to cache a large number of useless packages and add a large number of useless flow table entries, eventually resulting in overflow of the flow table. In addition, the switches will send many requests to the controller, causing the controller to perform a denial of service and thus making the entire network paralyzed.

The controller is the core of SDN network, and the DDoS attack targeting the controller may block the normal operation of network security detection system, so this form of DDoS attack is highly sensitive to time delay.

SUMMARY

The disclosure provides a method for detecting and defending a Distributed Denial of Service (DDoS) attack in an SDN environment, the method comprising:

calculating an entropy feature by a pre-detection module to detect DDoS attacks targeting a controller;
building data messages acquired as feature messages by a proxy module;
sending the feature messages to a CART detection module to obtain a detection result;
making a decision instruction based on the detection result; and
performing control release operations by the proxy module based on the decision instruction In a class of this embodiment, before building data messages acquired as feature messages by a proxy module, the method further comprises:
preprocessing data flows by a pre-detection module.

In a class of this embodiment, preprocessing the data flows by a pre-detection module comprises:
acquiring entropy values of a destination address of a package as the package flows in ports;
comparing the acquired entropy values of the destination address with a default threshold; and
when the entropy values of the destination address of no less than three ports are greater than the default threshold, rate-limiting the ports to ensure normal detection and control command issuing.

In a class of this embodiment, the method of building the detection model comprises:
building data sets based on the feature messages;
performing feature selection and training on the data sets to obtain feature subsets; and
iterating the feature subsets to obtain the detection model.

In a class of this embodiment, the data messages comprise a request, a statistical message sent by switches to the controller, data held by the controller, or a combination thereof.

In a class of this embodiment, the feature messages comprise an index component and a feature domain component.

The feature domain component comprises control information and combined features.

The combined features comprise the average number of packages in each data flow, the average number of bytes in each data flow, the average duration in each data flow, the proportion of pair flows, the change rate of asymmetric flows, the change rate of ports, or a combination thereof.

In a class of this embodiment, the method of building data sets based on the feature messages comprises:
generating a plurality of sample sets based on the feature messages;
marking each sample set, which is marked as 0 in case of no attack, marked as 1 in case of a DDoS attack launched by IP address forgery, marked as 2 in case of SYN flooding, marked as 3 in case of UDP flooding, and marked as 4 in case of ICMP flooding; and
classifying a plurality of marked samples into training sample sets and test sample sets, namely the data sets.

In a class of this embodiment, the method of performing feature selection on the data sets comprises:
classifying the data sets by a classifier, and assigning weights to the obtained features;
taking and sorting absolute values of the feature weights; and
filtering the feature weights based on the sorted absolute values.

In a class of this embodiment, training on the data sets comprises:
taking the training set and the threshold of Gini coefficient as an input;

selecting a feature, calculating the Gini coefficient of the selected feature according to the type of feature, and selecting a feature with the minimal Gini coefficient and its corresponding attributes as splitting criteria;

splitting the sample sets based on the value of the feature, dividing the sample sets into sub-nodes, performing the recursion process until the Gini coefficient is less than the threshold or there is no feature, and outputting a decision tree, where performing the recursion process is to select a feature repeatedly; and pruning the decision tree to generate the detection model.

In a class of this embodiment, the decision instruction comprises a host blocking, a port blocking, a host isolation instruction, or a combination thereof.

In a class of this embodiment, the method of controlling the controller according to the decision instruction comprises:

when the obtained decision instruction is host blocking: dropping attacking packages by the controller;

when the obtained decision instruction is port blocking: blocking response attack ports by the controller; and when the obtained decision instruction is host isolation: dropping all packages from a source host by the controller.

The disclosure provides a method for detecting and defending a DDoS attack in an SDN environment, comprising: firstly, installing an entropy-based pre-detection module at an entry of a switch port to ensure that SDN facilities will not prematurely perform a denial of service when being attacked by the DDoS attack; secondly, realizing the separation of security and control by installing an proxy module additionally in a controller program to ensure that the detection itself will not occupy excessive resources of the controller and switches; finally, using a detection algorithm combining recursive feature elimination (RFE) and classification and regression tree (CART) to ensure efficiency and accuracy of detection.

DETAILED DESCRIPTION

An objective of the disclosure is to provide a method for detecting and defending a DDoS attack in an SDN environment to solve the problems of high resource occupation or low detection accuracy in the prior art.

As shown in FIGS. 1-5, the disclosure provides a method for detecting and defending a DDoS attack in an SDN environment, comprising:

1) A pre-detection module preprocesses data;

entropy values of a destination address of a package are acquired as the package flows in ports;

the acquired entropy values of the destination address are compared with a default threshold; and when the entropy values of the destination address of no less than three ports are greater than the default threshold, the ports are rate-limited.

Figure 1:
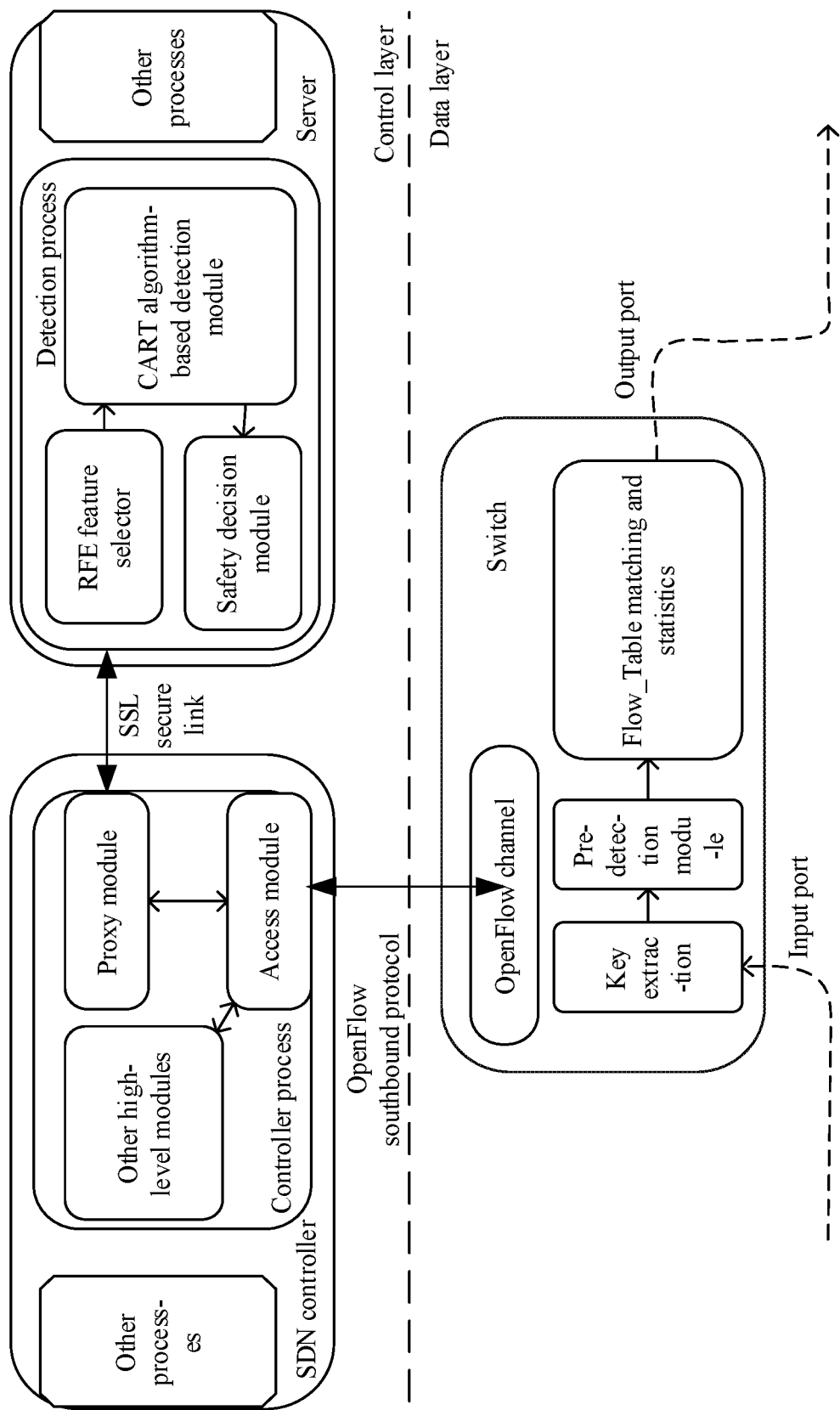
FIG. 1 is a schematic diagram of a module according to one embodiment of the disclosure.
Figure 2:
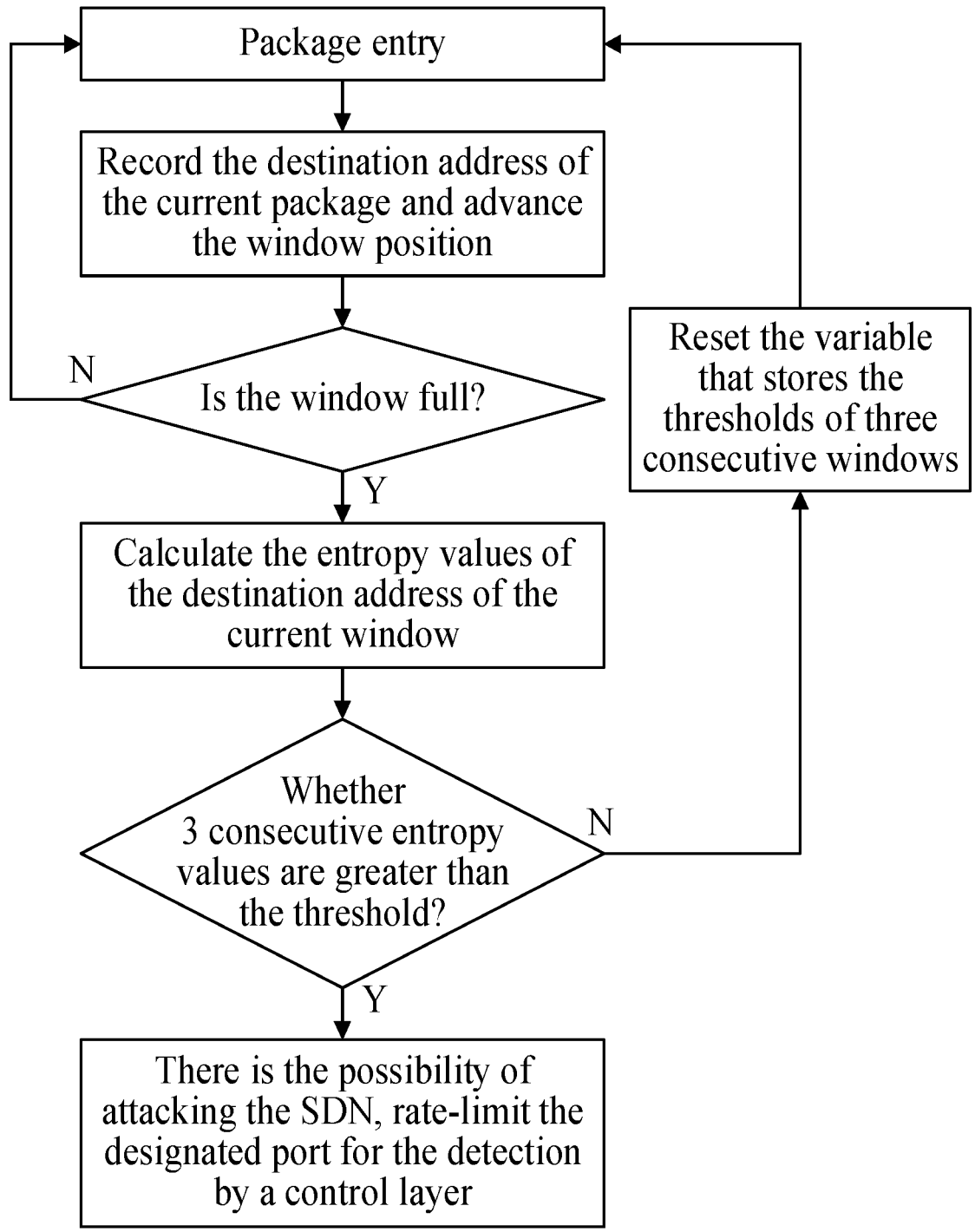
FIG. 2 is a schematic diagram of a detection flow according to one embodiment of the disclosure.

Specific implementation steps are as follows:

The pre-detection module is installed additionally. A pre-detection process is shown in FIG. 2. A lightweight entropy detection algorithm is adopted to detect the entropy values of the destination address of each ingress port. If the entropy values are greater than the threshold in three consecutive windows, there is probably an attack. The corresponding ports should be rate-limited for detection by a control layer to ensure that the SDN will not be paralyzed immediately under the DDoS attack and that the subsequent detection and control command issuing operations can be performed normally.

2) A proxy module builds data messages acquired as feature messages.

At intervals of $\Delta t$, the proxy module of a controller builds the feature messages based on the requests and statistical messages sent by switches to the controller and data held by the controller, and forwards these messages to a high-performance computer running a detection algorithm.

The feature message comprises an index component and a feature domain component.

The feature domain component comprises control information and combined features.

The combined features comprise the average number of packages in each data flow, the average number of bytes in each data flow, the average duration in each flow, the proportion of pair flows, the increment in unidirectional flows, the change rate of ports and the change rate of asymmetric flows.

Figure 3:
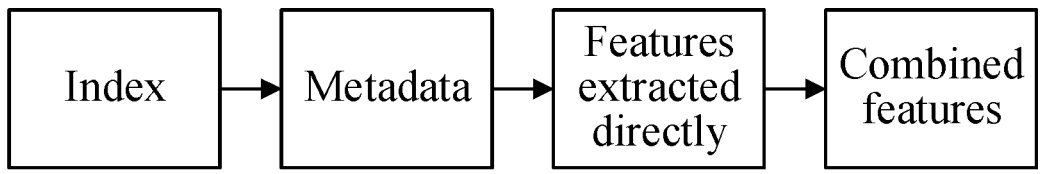
FIG. 3 is a schematic diagram of a feature message format according to one embodiment of the disclosure.

As shown in FIG. 3, it is a message format of one feature, and each feature builds packages in this format. The message mainly comprises two parts. The first part is the index component comprising Index fields and metadata fields. The Index field comprises Datapath_ID and OpenFlow match fields of the switches, and the metadata field comprises some additional information, comprising provenance information of timestamp and flows.

The second part is the feature domain mainly comprising two categories. The first category is the control information directly obtained through an OpenFlow control protocol. For example, the switch will send the statistical information of the current switch to the controller at regular intervals, and the messages can be directly extracted from the packages. The second category is combined features obtained through calculation by predefined formulas. The features, which are often only available in the SDN, can make full use of the advantages of the SDN, for example, by calculating how much traffic can be output to its associated ports.

The predefined combined features are listed below.

(1) Average number of packages in each flow: one of the main features of DDoS attacks is source IP spoofing, which makes it very difficult to track the attack source. One adverse effect is that the generated flows have only a small number of packages, i.e., about 3 packages in each flow. Considering that normal traffic usually contains more packages, the average value is calculated. Before calculating this value, the flows are sorted in ascending order based on the number of packages in each flow. The formula is as follows:

$$\text{Average number of packages in each flow} = \tag{1}$$

$$\begin{cases} \text{Num\_Packages}(n/2), & n \text{ is an even number} \\ \dfrac{\text{Num\_Packages}(n/2) + \text{Num\_Packages}((n+1)/2)}{2}, & n \text{ is an odd number} \end{cases}$$

where Num_Package(n/2) is the number of packages in the $n/2^{th}$ flow,

Num_Package((n+1)/2) is the number of packages in the $(n+1)/2^{th}$ flow, and n is the total number of flows;

(2) Average number of bytes in each flow: Another special feature of DDoS attacks is its payload size, which is usually very small to improve the effectiveness of such attacks. For example, in a TCP flooding attack, 120-byte packages are sent to a sufferer. The formula is as follows:

$$\text{Average number of bytes in each flow} = \frac{\sum_{i=1}^{n} \text{flow byte } i}{n} \quad (2)$$

where flow byte$_i$ is the number of bytes in the $i^{th}$ flow.

(3) Average duration in each flow: Similarly, the duration of the flow spent in the flow table shall be the average value. This function can reduce the number of false positives when there are a small number of packages exchanged between applications. The formula is as follows:

Average duration in each flow =
$$\begin{cases} \text{Duration}(n/2), & n \text{ is an even number} \\ \dfrac{\text{Duration}(n/2) + \text{Duration}((n+1)/2)}{2} & n \text{ is an odd number} \end{cases} \quad (3)$$

where Duration(n/2) is the duration of the $n/2^{th}$ flow and Duration((n+1)/2) is the duration of the $(n+1)/2^{th}$ flow.

(4) Proportion of pair flows: The function allows verification of how many pair flows in a certain interval. For example, check the following conditions to verify whether any two flows may constitute pair flows: the source IP of the first flow is the same as the destination IP of the second flow; the destination IP of the first flow is the same as the source IP of the second flow; and the two flows have the same communication protocol. DDoS attacks will send packages with IP spoofing to increase the number of single flows entering the network. To calculate the probability of occurrence, the formula is as follows:

$$\text{Proportion of pair flows} = \frac{2 * \text{Num\_pair-flows}}{n} \quad (4)$$

where Num_pair-flows is the number of pair flows;

(5) Change rate of asymmetric flows: At the beginning of a DDoS attack, the number of flows may surge. In order to calculate the increment, the total number of flows needs to be subtracted by twice the number of pair flows and then divided by the time interval over which the flow features are analyzed:

$$\text{Change rate of asymmetric flows} = \frac{n - (2 * \text{Num\_pair-flows})}{\text{interval}} \quad (5)$$

where interval is the time interval.

(6) Change rate of ports: In the same way that IP spoofing is generated by a DDoS attack, ports may also be randomly generated by an attack. The following formula is calculated as the feature of metering the change rate of ports;

$$\text{Change rate of ports} = \frac{\text{Num\_ports}}{\text{interval}} \quad (6)$$

where Num_ports is the total number of destination ports counted per time interval.

In 3), the feature messages are sent to a pre-built detection model to obtain a detection result.

The method of building the detection model comprising 3.1) to 3.3).

3.1) Data sets are built based on the feature messages. The method comprising:
a plurality of sample sets is generated based on the feature messages;
each sample set is marked;
a plurality of marked samples is classified into training sample sets and test sample sets, namely the data sets.
Specific implementation steps are as follows.

Over a sustained period of time, a server collects enough messages from the controller to build the data sets. Firstly, the data sets are classified into a plurality of sample sets, and each sample set represents each port and its corresponding features. Each sample set needs to be marked, where it is marked as 0 in case of no attack, marked as 1 in case of a DDoS attack launched by IP address forgery, marked as 2 in case of SYN flooding, marked as 3 in case of UDP flooding, and marked as 4 in case of ICMP flooding. Corresponding response is made according to the type of DDoS attacks. The marked data sets are classified into the training sample sets and the test sample sets. Training sample sets are named train.txt, and the test sample sets are named test.txt.

3.2) Feature selection and training are performed on the data sets to obtain feature subsets.

3.2.1) The method of performing feature selection comprises:
the data sets are classified by a classifier, and weights are assigned to the obtained features;
absolute values of feature weights are taken and sorted;
the feature weights are filtered based on the sorted absolute values;
Specific implementation steps are as follows.

Figure 4:
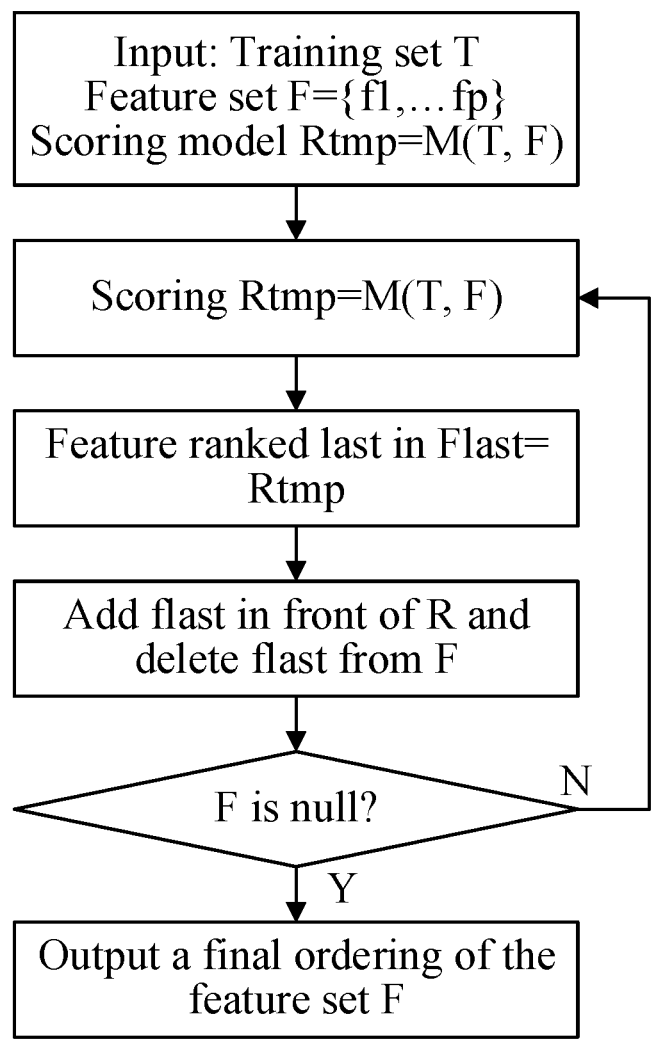
FIG. 4 is a schematic diagram of an RFE feature selection flow according to one embodiment of the disclosure.

RFE is a method of selecting features by recursively reducing feature sets and repeatedly building models. An optimal feature subset can be obtained after several iterations, which can ensure the accuracy of detection and speed up the detection process. As shown in FIG. 4, it is a schematic diagram of an RFE feature selection flow. Each iteration comprises:
(1) a CART classifier is trained on the current feature set, and weights are assigned to all features (i.e., scoring);
(2) the absolute values of weights of all features are sorted;
(3) the feature ranked last is deleted from the current feature set.

3.2.2) The training method comprises:

The training set and the threshold of Gini coefficient are taken as an input.

A feature is selected, and the Gini coefficient of each attribute (value of the feature) is calculated according to the type of feature (including continuous features and discrete features). Finally, a feature with the minimal Gini coefficient and its corresponding attributes are selected as splitting criteria (every sample has this feature, and samples are classified based on the value of this feature).

The sample sets are divided into sub-nodes, the above process is performed recursively until the Gini coefficient is less than the threshold or there is no feature, and a decision tree is output.

The decision tree is pruned to generate the detection model.

Specific implementation steps are as follows.

Figure 5:
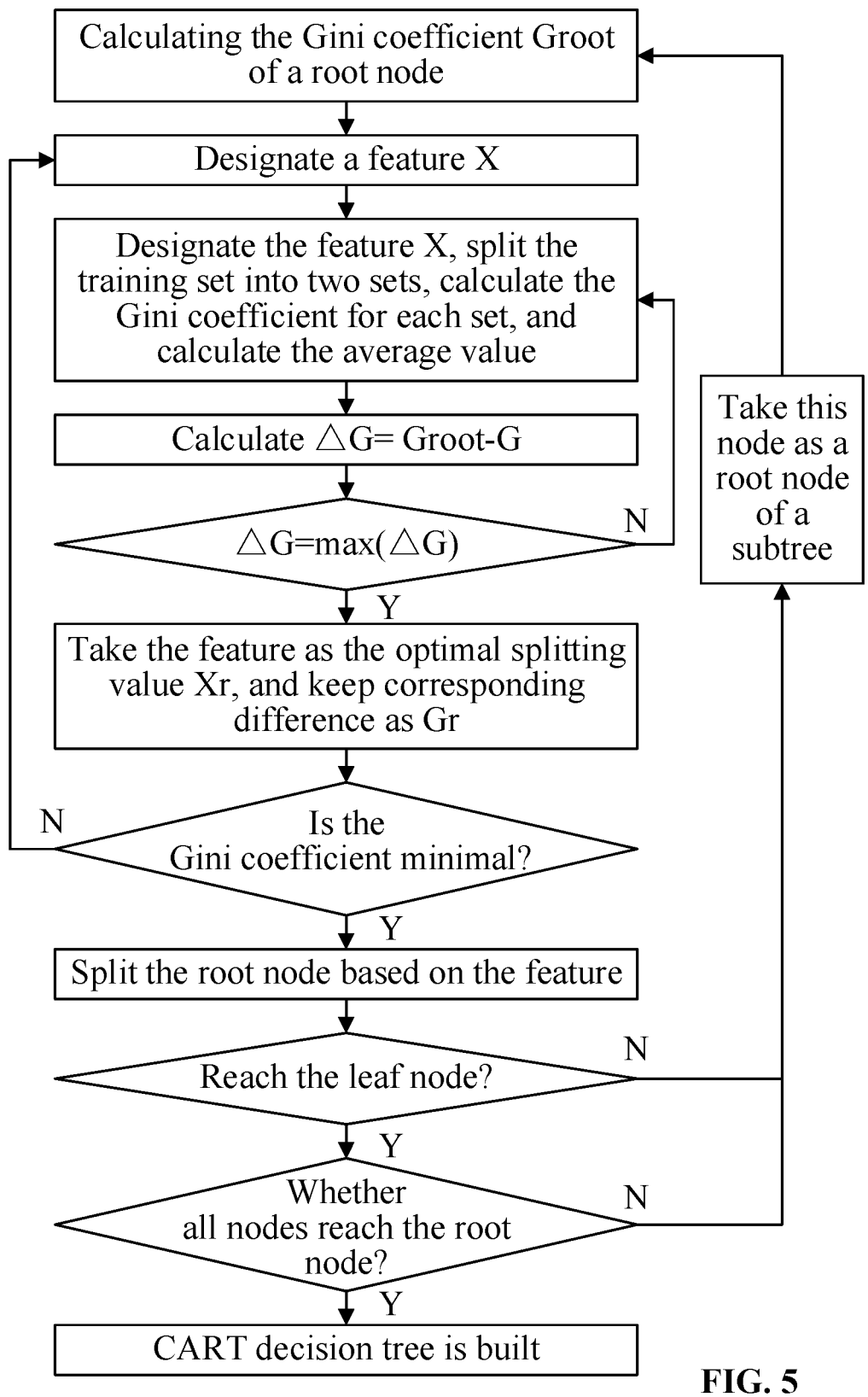
FIG. 5 is a schematic diagram of a CART training flow according to one embodiment of the disclosure.

As shown in FIG. 5, it is a schematic diagram of a CART training flow. Like the algorithms ID3 and C4.5, CART builds a decision tree from top down by a greedy strategy. Compared with the algorithms ID3 and C4.5, CART adopts the Gini coefficient as a node splitting criterion. The Gini coefficient is mainly a measure of the impurity of the data partitioning or training data set D. The smaller the Gini coefficient, the higher the purity of the sample (that is, the higher the probability that the samples belong to the same category). By measuring Gini coefficients of all values of a certain feature in the data set, Gini Split info (Gini Gain) of the feature can be obtained. The formula is as follows:

$$Gini(p)=\Sigma_{k=1}^{k}P_k(1-P_k)=1-\Sigma_{k=1}^{k}P_k^2 \qquad (8)$$

where Gini(p) is the Gini coefficient of probability distribution, $P_k$ is the probability that the selected sample belongs to K category, and K is the number of categories in the sample set D.

If the sample set D is split into a set D1 and a set D2 according to a certain feature (such as the average number of bytes in each flow), it can be expressed as the following formula:

$$Gini(D, A) = \frac{D1}{D}Gini(D1) + \frac{D2}{D}Gini(D2) \qquad (9)$$

where A represents a feature of the split data sets, Gini(D1) represents the uncertainty of a set D1, Gini(D2) represents the uncertainty of a set D2, and Gini(D, A) represents the uncertainty of the set D split based on the feature A.

Therefore, to find the most appropriate splitting criterion and splitting value for the data set D contained in each node, the Gini coefficients before and after splitting are calculated, and the difference is a splitting point desired. The formula is as follows:

$$\Delta_A(D)=Gini(D)-Gini_A(D) \qquad (10)$$

where Gini(D) is the Gini coefficient before splitting, $Gini_A(D)$ is the Gini coefficient after splitting based on the feature A, and $\Delta_A(D)$ is the difference between the coefficients before and after splitting.

Therefore, the algorithmic language of the CART classification tree is described as follows.

(1) A root node contains all training tuples, and each tuple consists of multiple attributes. The optimal splitting criterion and splitting value may be derived by comparing the difference in the split Gini coefficients after multiple calculations. Next, the node is split in two at this splitting value.

(2) (1) is repeated after child nodes are generated. There are three main conditions for ending the recursion: the data set is null, the attribute list is null, or the data sets in the node belong to the same category.

After the decision tree is built, it is pruned to avoid over-fitting. It is a very critical part of the process. To adopt a later pruning strategy, it is necessary to make the tree grow completely until all leaf nodes are pure and have no training error when building the decision tree, and find and prune over-fitted subtrees. In this way, the tree is lower in height and fewer in branches, thus improving the speed of data classification. CART is pruned by a Cost-Complexity Pruning (CCP) algorithm. The algorithm is adopted to generate a series of pruned subtrees Tk of Tmax: T1>T2>T3 . . . >Tk (Tk is a tree with root and left and right subtrees as leaf nodes). The pruning process completes two main steps of generating an ordered tree sequence and determining the category to which the leaf nodes belong.

(1) A subtree sequence {T0, T1, T2, . . . , Tn} is generated from the initial decision tree, where Ti+1 means that it is derived from Ti and TN represents a root node. The method of generating the subtree comprises:

a trained decision tree has several sub-nodes at each node t, so a loss function $C_\alpha(t)$ before pruning is:

$$C_\alpha(t)=C(t)+\alpha \qquad (11)$$

where $C_\alpha(t)$ is the prediction error without any penalty term, a is the regularization parameter. When $\alpha=0$, there is no regularization, and the original CART tree is the optimal subtree. When $\alpha=\infty$, the regularization strength is maximum, and a single-node tree consisting of the root nodes of the original CART tree is the optimal subtree.

The loss function $C_\alpha(T_t)$ after pruning is:

$$C_\alpha(T_t)=C(T_t)+\alpha|T| \qquad (12)$$

where $C(T_t)$ is the prediction error of the training data, |T| is the number of leaf nodes of the subtree T, and $T_t$ is the tree with t as its root node.

The error gain of $\alpha$ is calculated by increasing $\alpha$ from 0 to a certain value that can make the loss functions before and after pruning just equal to each other. The formula is as follows:

$$\alpha = \frac{C(t) - C(T_t)}{|T_t| - 1} \qquad (13)$$

The error gain is calculated for each node of a decision tree $T_0$, the t with the minimal a is selected and pruned to obtain a subtree $T_1$, and the above process is performed recursively to finally obtain $\{T_0, T_1, T_2, \ldots, T_n\}$;

(2) The optimal decision tree is selected from the subtree sequence based on the true error of the tree.

In 3.3), the feature subsets are iterated to obtain the detection model.

A decision instruction is made based on the detection result.

The decision instruction includes host blocking, port blocking and host isolation instructions.

The proxy module performs control operations based on the decision instruction.

The method of performing comprises:

When the obtained decision instruction is host blocking: attacking packages are dropped by the controller.

When the obtained decision instruction is port blocking: response attack ports are blocked by the controller.

When the obtained decision instruction is host isolation: all packages are dropped from a source host by the controller.

Specific implementation steps are as follows.

The trained CART decision tree can be used to detect DDoS attacks. The decision module is used to alleviate the impact caused by a DDoS attack by making appropriate actions according to the type of DDoS attack after the attack is detected. The decision module implements the function of controlling a data plane through a proxy.

These actions mainly comprise:

(1) Host blocking: In a fast DDoS attack, the attacker controls a botnet to send a large number of requests to a target host, which can exhaust the host resources in a short time. When the attack target is in the network governed by the controller, these attacking packages should be dropped to alleviate the impact of the attack.

(2) Port blocking: In the SDN, both the controller and the switches may be targets of DDoS attacks. The attacker often sends a large number of unknown packages to the SDN, which will cause two adverse effects. First, the switches cache a large number of useless flow table entries, and each switch can only cache a limited number of flow table entries. Second, the controller is busy processing the useless requests, which may exhaust the computing resources of the controller and make the normal requests unable to be processed in time. Therefore, the response attack ports should be blocked to ensure the normal operation of the entire network. Also, in order to mitigate the damage caused by this attack as early as possible, a lightweight preprocessing module is installed in the switch to ensure that the entire network will not be paralyzed until return of control.

(3) Host isolation: If the attack source is within the network, the attack source should be isolated and all packages from that host should be dropped, thus achieving a mitigation effect.

It will be obvious to those skilled in the art that changes and modifications may be made, and therefore, the aim in the appended claims is to cover all such changes and modifications.

What is claimed is:

1. A method, installing an entropy-based pre-detection module at an entry of a port of a switch, and a proxy module on a controller, comprising:
   acquiring, by the entropy-based pre-detection module, entropy values of a destination address of a package when the package flows in ports;
   comparing the acquired entropy values of the destination address with a default threshold; and
   when the entropy values of the destination address of no less than three ports are greater than the default threshold, rate-limiting the ports;
   sending, by the switch, a request and a statistical message to the controller;
   building, by the proxy module, data messages acquired as feature messages, and sending the feature messages to a classification and regression tree (CART) detection model of a server to obtain a detection result, wherein the data messages comprise a request, a statistical message, and data held by the controller;
   making, by the server, a decision instruction based on the detection result;
   performing, by the proxy module, actual control release operations based on the decision instruction, comprising:
   dropping attacking packages when the obtained decision instruction is a host blocking;
   blocking response attack ports when the obtained decision instruction is a port blocking; and
   dropping all packages from a source host when the obtained decision instruction is a host isolation.

2. The method of claim 1, wherein a method of building the CART detection model comprises:
   building data sets based on the feature messages;
   performing feature selection and training on the data sets to obtain feature subsets; and
   iterating the feature subsets to obtain the CART detection model.

3. The method of claim 2, wherein a method of building data sets based on the feature messages comprises:
   generating a plurality of sample sets based on the feature messages;
   marking each sample set, which is marked as 0 in case of no attack, marked as 1 in case of a distributed denial of service (DDoS) attack launched by IP address forgery, marked as 2 in case of synchronize sequence numbers (SYN) flooding, marked as 3 in case of user datagram protocol (UDP) flooding, and marked as 4 in case of internet control message protocol (ICMP) flooding; and
   classifying a plurality of marked samples into training sample sets and test sample sets, and the data sets comprising the training sample sets and test sample sets.

4. The method of claim 2, wherein a method of performing feature selection on the data sets comprises:
   classifying the data sets by a classifier, and assigning weights to the obtained features;
   taking and sorting absolute values of the weights of the obtained features; and
   filtering the weights of the obtained features based on the sorted absolute values.

5. The method of claim 2, wherein training on the data sets comprises:
   taking a training set and a threshold of a Gini coefficient as an input;
   selecting features,
   calculating the Gini coefficient of the selected features according to types of the features, and
   selecting a feature with a minimal Gini coefficient and its corresponding attributes as splitting criteria;
   dividing the sample sets into sub-nodes,
   performing a recursion process until the Gini coefficient is less than the threshold or there is no feature, and outputting a decision tree, where performing the recursion process is to select the features repeatedly; and
   pruning the decision tree to generate the CART detection model.

6. The method of claim 1, wherein the feature messages comprise an index component and a feature domain component;
   the feature domain component comprises control information and combined features; and
   the combined features comprise one or more of an average number of packages in each data flow, an average number of bytes in each data flow, an average duration in each data flow, a proportion of pair flows, a change rate of asymmetric flows, and a change rate of ports.

* * * * *